US008505461B2

(12) United States Patent
Phillips et al.

(10) Patent No.: US 8,505,461 B2
(45) Date of Patent: *Aug. 13, 2013

(54) LINE INSPECTION ROBOT AND SYSTEM

(75) Inventors: Andrew John Phillips, Harrisburg, NC (US); Mark Major, San Antonio, TX (US); Glynn R. Bartlett, Boerne, TX (US)

(73) Assignee: Electric Power Research Institute, Inc., Charlotte, NC (US)

( * ) Notice: Subject to any disclaimer, the term of this patent is extended or adjusted under 35 U.S.C. 154(b) by 212 days.

This patent is subject to a terminal disclaimer.

(21) Appl. No.: 13/024,535

(22) Filed: Feb. 10, 2011

(65) Prior Publication Data
US 2011/0192315 A1     Aug. 11, 2011

Related U.S. Application Data

(60) Provisional application No. 61/303,047, filed on Feb. 10, 2010.

(51) Int. Cl.
*B61B 7/00* (2006.01)
*B61B 7/06* (2006.01)

(52) U.S. Cl.
USPC ............................................. 104/87; 104/112

(58) Field of Classification Search
USPC ................. 104/87, 93, 96, 98, 112, 115, 116, 104/182, 184, 185, 202, 204, 215; 105/30, 105/148, 150
See application file for complete search history.

(56) References Cited

U.S. PATENT DOCUMENTS

| 891,154 A * | 6/1908 | Driver | 104/87 |
|---|---|---|---|
| 1,043,599 A * | 11/1912 | Jensen | 104/87 |
| 1,602,271 A * | 10/1926 | Kilcarr | 104/87 |
| 4,904,996 A | 2/1990 | Fernandes | |
| 5,103,739 A | 4/1992 | Sawada et al. | |
| 6,494,141 B2 | 12/2002 | Montambault et al. | |
| 7,552,684 B2 * | 6/2009 | Montambault et al. | 104/112 |
| 7,823,511 B2 * | 11/2010 | Lins et al. | 104/127 |
| 2011/0083577 A1 * | 4/2011 | Tilley | 104/96 |

OTHER PUBLICATIONS

Toussaint, K., Pouliot, N., Montambault, S., "Transmission Line Maintenance Robots Capable of Crossing Obstacles: State-of-the-Art Review and Challenges Ahead", Journal of Field Robotics, 2009, pp. 477-499, vol. 26, No. 5. Canada.
Nayyerloo, M., Chen, X., Wang, W. Chase, J., "Cable-Climbing Robots for Power Transmission Lines Inspection", Mobile Robots-State of the Art in Land, Sea, Air, and Collaborative Missions, 2009, pp. 63-84, I-Tech Education and Publishing, Vienna.
Kim, Y., Yi, B., Song, J., Shin, J., Lee, J., "Implementing a Prototype System for Power Facility Management Using RFID/WSN", International Journal of Applied Mathematics and Computer Sciences, 2006, pp. 70-75, vol. 2, No. 2, Korea.

* cited by examiner

*Primary Examiner* — S. Joseph Morano
*Assistant Examiner* — Zachary Kuhfuss
(74) *Attorney, Agent, or Firm* — Trego, Hines & Landenheim, PLLC

(57) ABSTRACT

The present invention relates to a diverter system to allow a line inspection robot to traverse an object. The diverter system includes a first diverter attached to a shield wire, a second diverter attached to the shield wire at a position spaced from the first diverter, and a bridge having a first end connected to the first diverter and a second end connected to the second diverter. The first diverter disengages the robot from the shield wire and onto the bridge and the second diverter disengages the robot from the bridge and onto the shield wire to allow the robot to traverse the object.

11 Claims, 24 Drawing Sheets

US 8,505,461 B2

LINE INSPECTION ROBOT AND SYSTEM

This application claims the benefit of Provisional Application No. 61/303,047 filed on Feb. 10, 2010.

BACKGROUND OF THE INVENTION

The present invention relates generally to a line inspection system and, more particularly, to an overhead electric transmission line inspection robot and system for inspecting transmission line components and right of way conditions.

Overhead electric transmission lines are one of the most diversely located assets within the utility industry, traversing thousands of miles, often in remote conditions. Increased reliability requirements, aging components, right of way inspections compliance, and budget constraints increase the need for thorough, timely, and cost effective inspections along the entire length of transmission lines.

BRIEF SUMMARY OF THE INVENTION

Accordingly, there is a need for an overhead transmission line inspection robot and system that provides automated remote inspection and monitoring of transmission line components and right of way conditions.

According to an aspect of the invention, a diverter system to allow a line inspection robot to traverse an object includes a first diverter attached to a shield wire, a second diverter attached to the shield wire at a position spaced from the first diverter, and a bridge having a first end connected to the first diverter and a second end connected to the second diverter. The first diverter disengages the robot from the shield wire and onto the bridge and the second diverter disengages the robot from the bridge and onto the shield wire to allow the robot to traverse the object.

BRIEF DESCRIPTION OF THE DRAWINGS

The subject matter that is regarded as the invention may be best understood by reference to the following description taken in conjunction with the accompanying drawing figures in which.

DETAILED DESCRIPTION OF THE INVENTION

Figure 1:
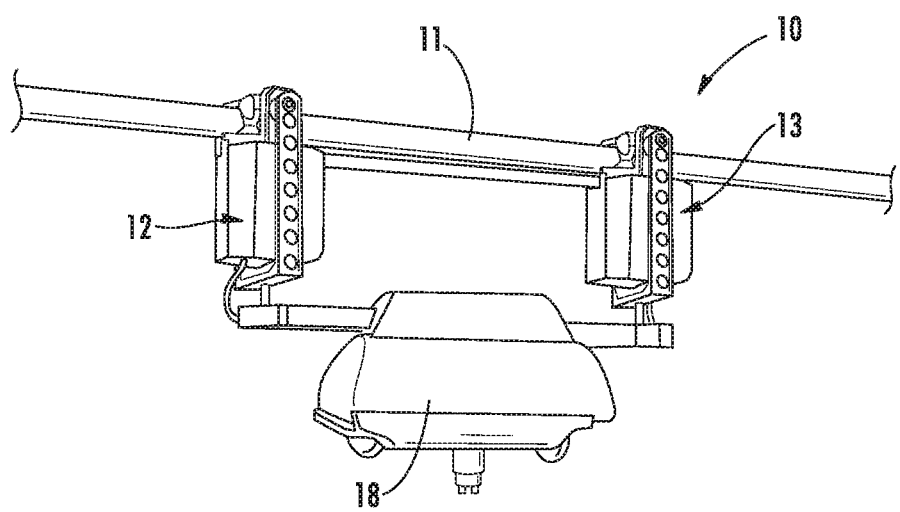
FIG. 1 shows a line inspection robot according to an embodiment of the invention.
Figure 2:
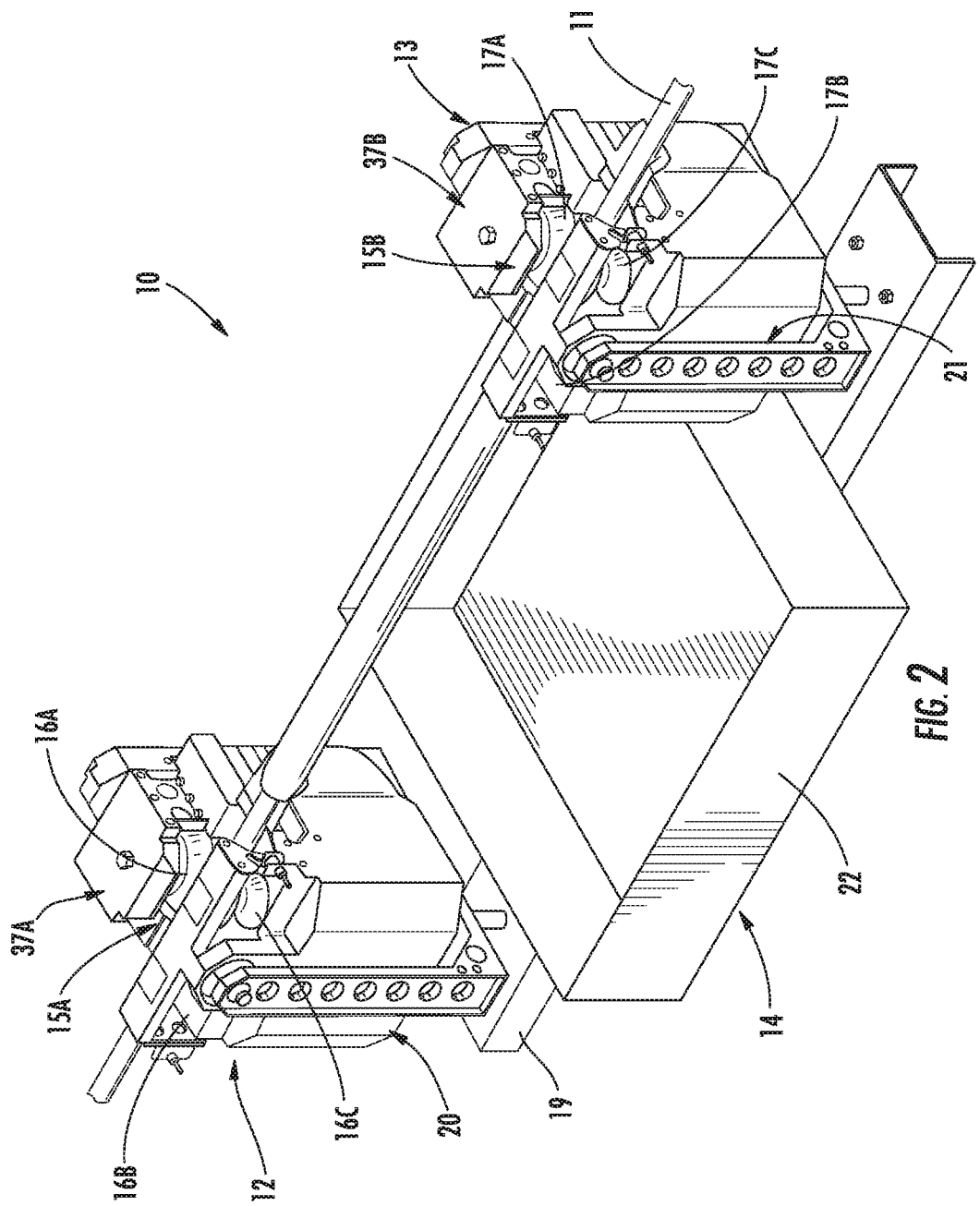
FIG. 2 is a perspective view of the inspection robot of FIG. 1.

Referring to the drawings, an exemplary inspection robot for inspection of overhead transmission lines according to an embodiment of the invention is illustrated in FIGS. 1 and 2 and shown generally at reference numeral 10. The robot 10 is designed to traverse overhead transmission lines to collect high fidelity information that utilities can immediately act on. The robot 10 travels on a shield wire 11 and identifies high risk vegetation, right of way encroachment, and component conditions using a variety of inspection technologies.

The robot 10 uses rechargeable batteries to provide power for motion, communications, inspection sensors, and processing. It should be appreciated that various sources of power harvesting may be used to charge the batteries. It should further be appreciated that more than one power harvesting source may be used at one time to create a hybrid system. The following power harvesting solutions may be used:

1. Solar panels 18 disposed on the robot 10 for harvesting solar energy to charge the batteries. The solar panels 18 are sealed for protection from the elements and are mounted on top of the robot 10 for optimal capture of solar energy. The panels 18 are also angled so that rain and gravity help wash away debris;
2. A plurality of charging stations positioned on structures dispersed along the line may be used to charge the batteries of the robot 10. The charging stations would charge slowly over a period of weeks into a battery using technologies such as electric field, magnetic field, solar, wind, thermal difference, and vibration so that when the robot 10 docks, energy from the charging stations is transferred to the robot's 10 battery;
3. The robot 10 may also be charged using E-field. In this scenario, a "Plate" is positioned below the robot which capacitively couples the E-field from the energized phases and continuously charges the battery;
4. The robot 10 may be charged using magnetic fields. If the shield wire is grounded to structures, currents will be flowing in the wire due to an imbalance in the phase currents. The power from this current will be harvested using an inductor or current transformer and sent to the battery for charging; and
5. In the case where the shield wire is insulated (one or both sides), the robot 10 will move to a structure where a shield wire insulator is and bridge the gap to the structure either with an impedance or a dead short. This will cause currents to flow. The currents and voltages will be developed and used to charge the battery. The robot 10 then progresses with its inspection duties until the robot's 10 battery needs recharged, at which time the robot 10 moves to the next available structure where the robot 10 charges itself again.

Figure 3:
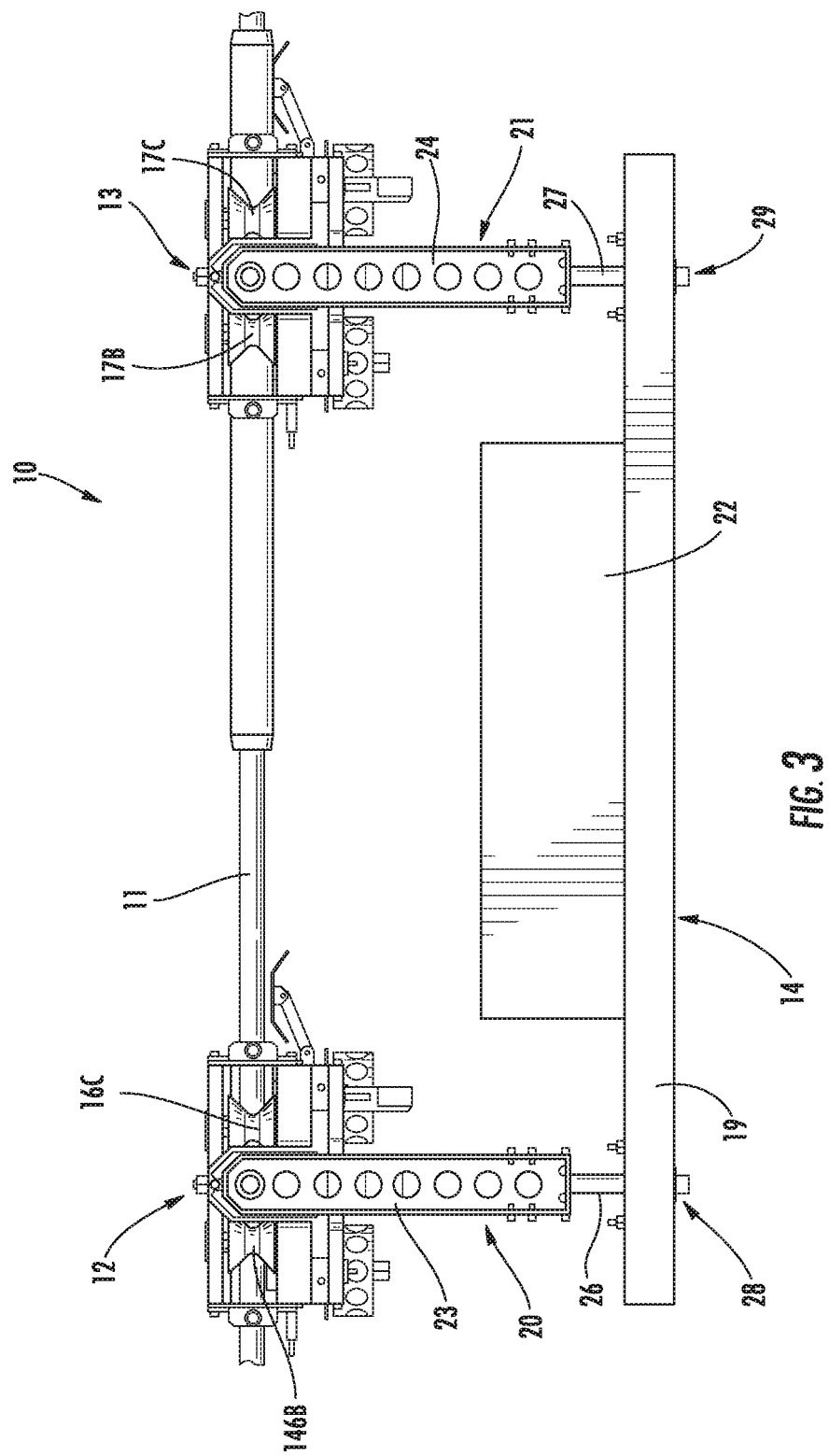
FIG. 3 shows a side view of the inspection robot of FIG. 1.

As shown in FIGS. 2 and 3, the robot 10 includes a pair of trucks 12 and 13 interconnected by a platform 14. The trucks 12 and 13 include drive systems 15A and 15B having wheels 16A, 16B, 16C and 17A, 17B, and 17C, respectively, for clamping onto the shield wire 11 and allowing the robot 10 to traverse the shield wire 11. The trucks 12 and 13 are connected to a support 19 of the platform 14 by pivot arms 20 and 21. The platform 14 further includes a basket 22 attached to the support 19. The basket 22 contains all of the electrical hardware and provides storage space for tools, etc. As shown, the basket 22 is mounted on top of the support 19; however, it should be appreciated that the basket 22 may also be mounted to a bottom of the support 19, FIG. 1.

Figure 4:
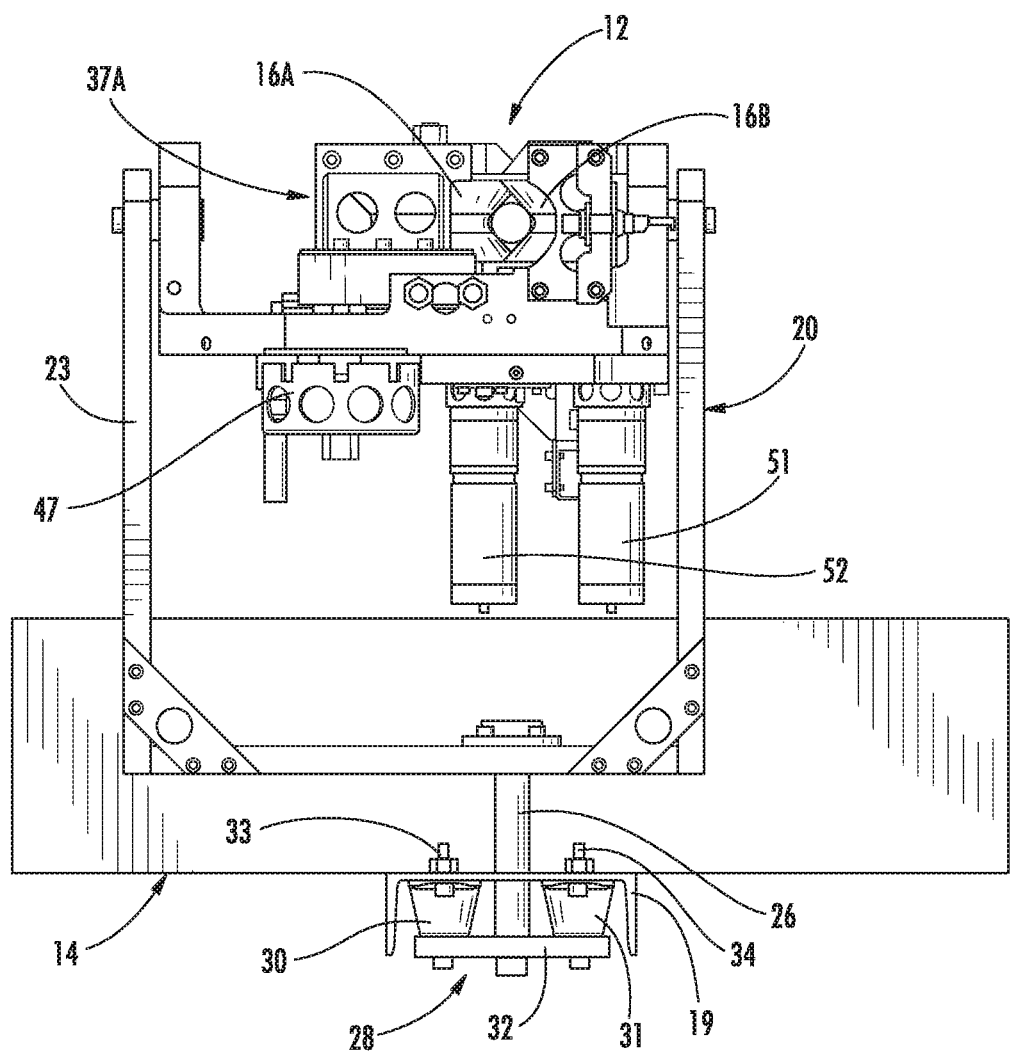
FIG. 4 shows an end view of the inspection robot of FIG. 1.

Referring to FIG. 4, pivot arms 20 and 21 (only pivot arm 20 is shown in FIG. 4) include brackets 23 and 24 and spindles 26 and 27 having mounting systems 28 and 29 for mounting the pivot arms 20 and 21 to opposing ends of the support 19. For simplicity only pivot arm 20 will be discussed in detail—pivot arm 21 is identical to pivot arm 20. As shown, the bracket 23 is pivotally connected to the truck 12 to allow the platform 14 to pivot or move relative to the truck 12 and the spindle 26 is rotatably connected to the bracket 23 at a first end to allow the platform 14 to articulate relative to the bracket 23. This allows the platform 14 and trucks 12 and 13 to have freedom of movement relative to each other, thereby allowing the robot 10 to move around turns or up and down grades.

The mounting system 28 is attached to a second end of the spindle 26 to allow the spindle 26 to be attached to the support 19. The mounting system 28 includes a pair of bushings 30 and 31 attached to a support 32 and fasteners 33 and 34 extending therethrough for connection to the support 19. As shown, the support 19 is positioned over the bushings 30 and 31 such that the fasteners 33 and 34 extend through holes in the support 19 to allow the support 19 to be securely fastened to the spindle 26.

Figure 5:
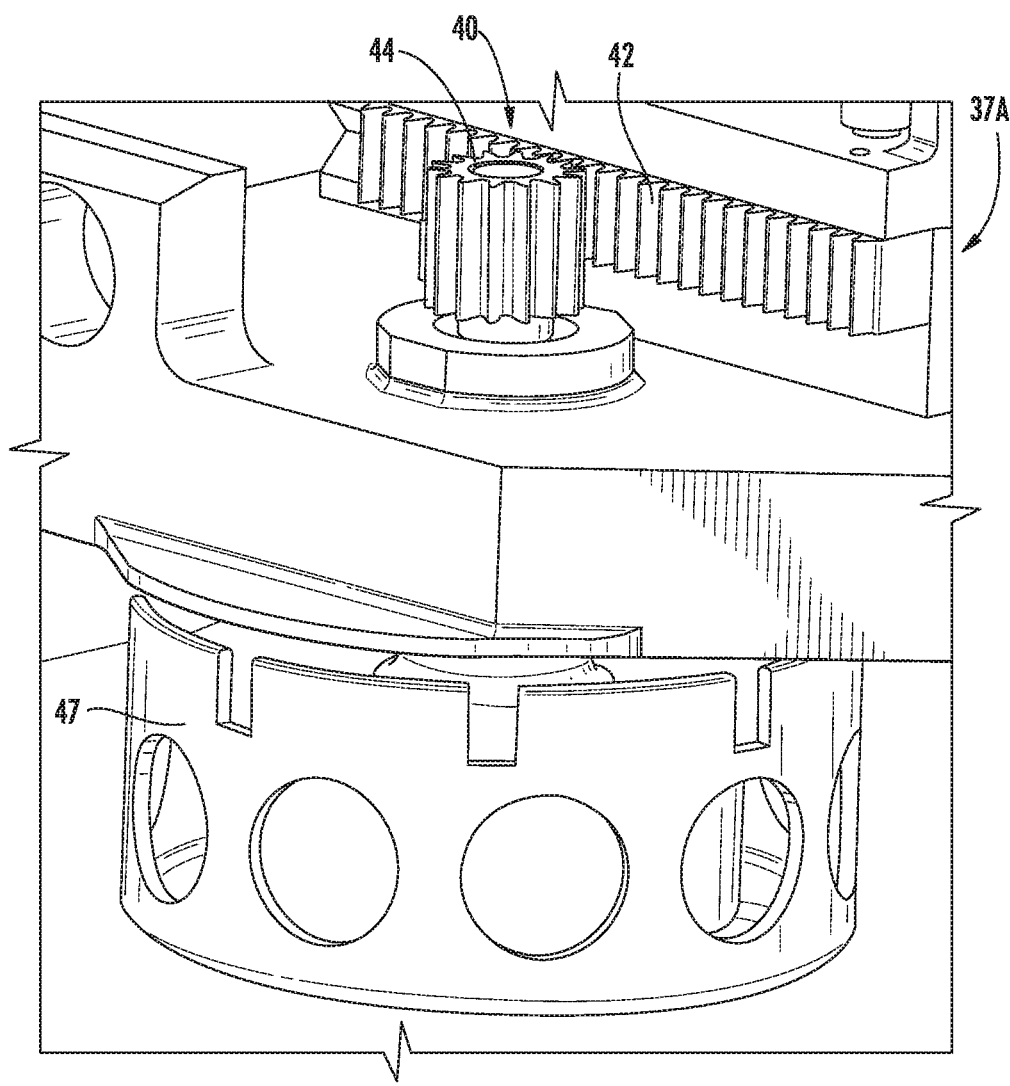
FIG. 5 shows a gear set of the inspection robot of FIG. 1.
Figure 6:
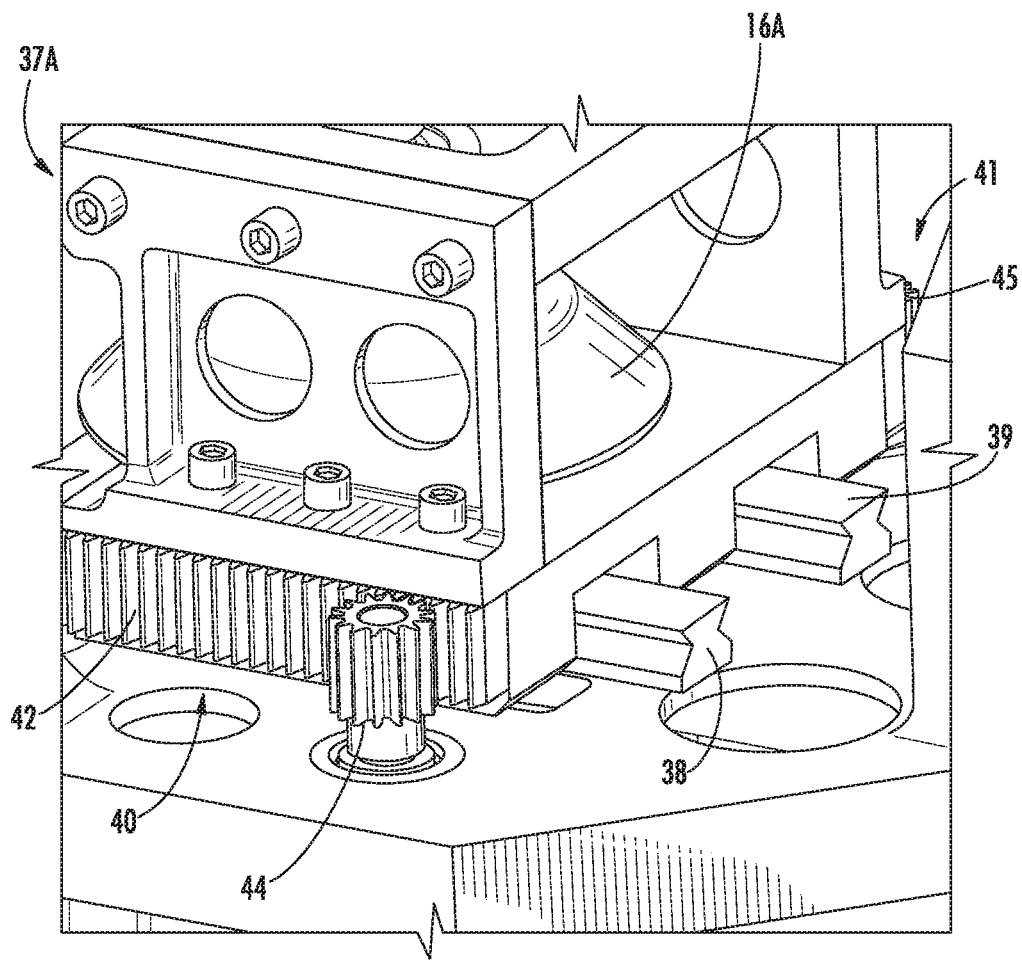
FIG. 6 shows the gear set of FIG. 4 engaging a wheel platform of the inspection robot of FIG. 1.
Figure 7:
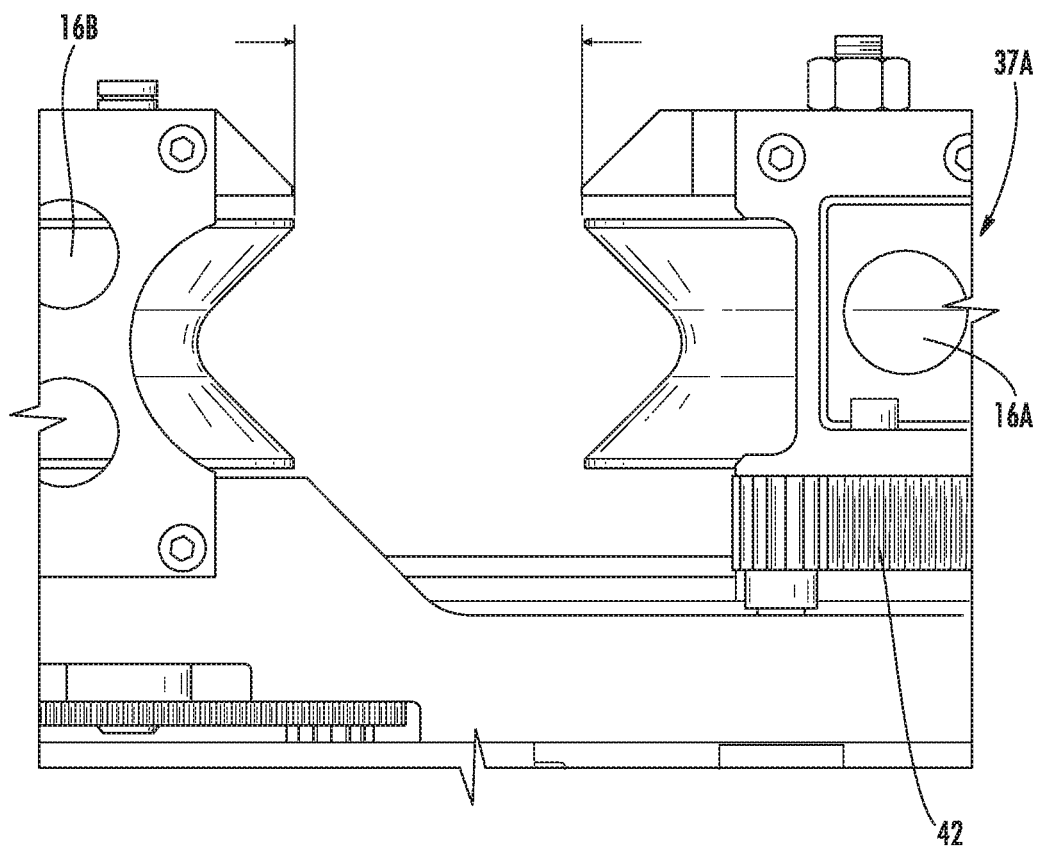
FIG. 7 shows a drive system of the inspection robot of FIG. 1 in an open position.
Figure 8:
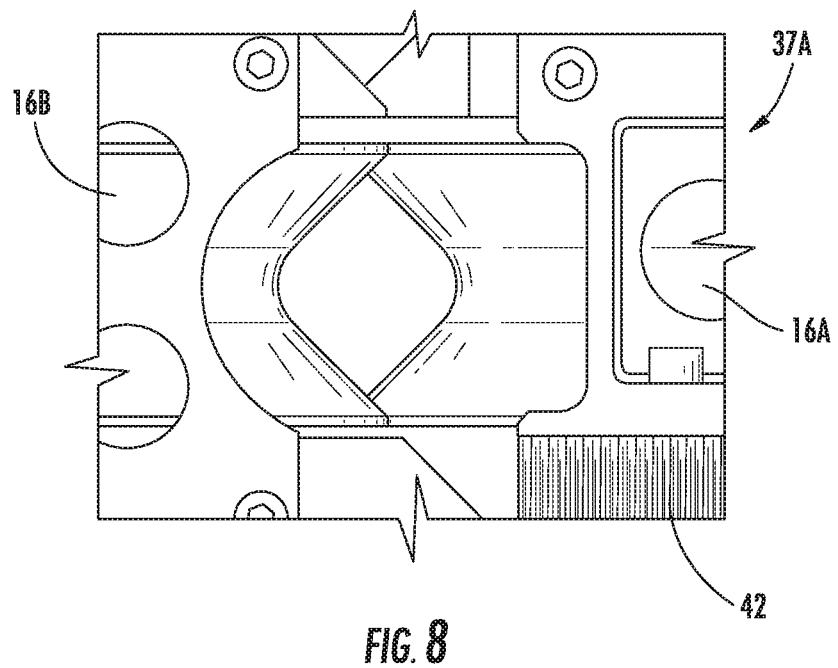
FIG. 8 shows the drive system of FIG. 7 in a closed position.
Figure 9:
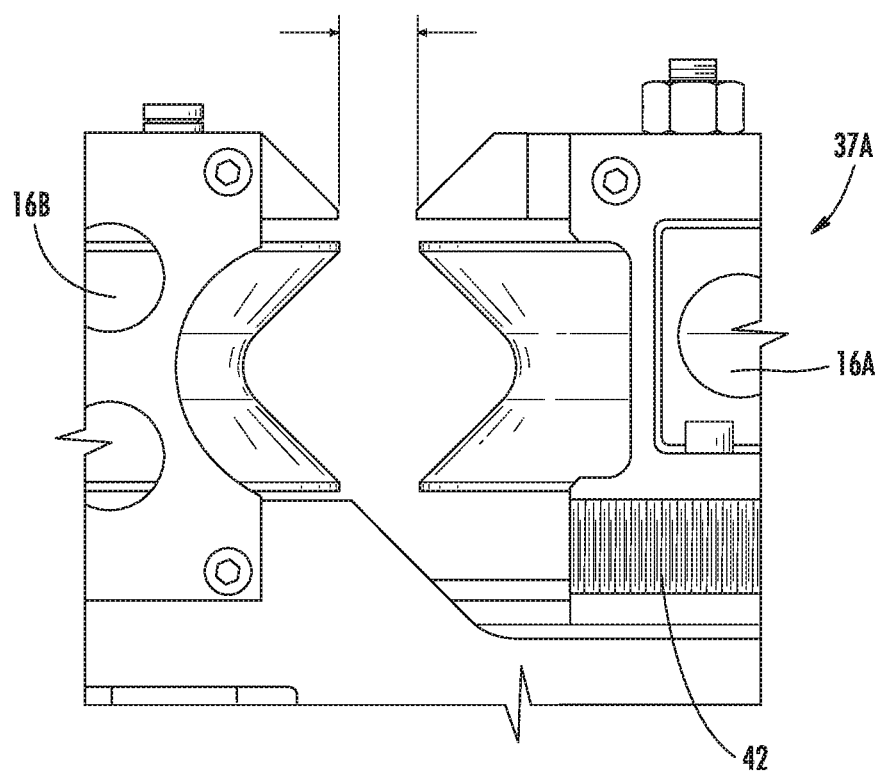
FIG. 9 shows the drive system of FIG. 7 in a restricted open position.

Referring to FIGS. 5 and 6, the wheels 16A and 17A are mounted to wheel platforms 37A and 37B, respectively, for movement between an open position, FIG. 7, for receiving a shield wire between opposing wheels (for example 16A and 16B, 16C) and a closed position, FIG. 8, for securing the shield wire between the opposing wheels. For discussion purposes, only platform 37A will be discussed. The wheel platform 37A is operably connected to a pair of rails 38 and 39 that allow the platform 37A to slide thereupon. Rack and pinion gear sets 40 and 41 move the platform 37A between the open position and closed position and include racks 42 and 43, pinions 44 and 45, and motors 47 and 48 for turning the pinions 44 and 45, thereby causing the platform 37A to move. The platform 37A may also be restricted to a maximum opening, FIG. 9, to prevent the wheels from disengaging the shield wire. This is done by engaging a gear lock 50, FIG. 10, which prevents the platform 37A from opening past the maximum allowed opening.

Figure 10:
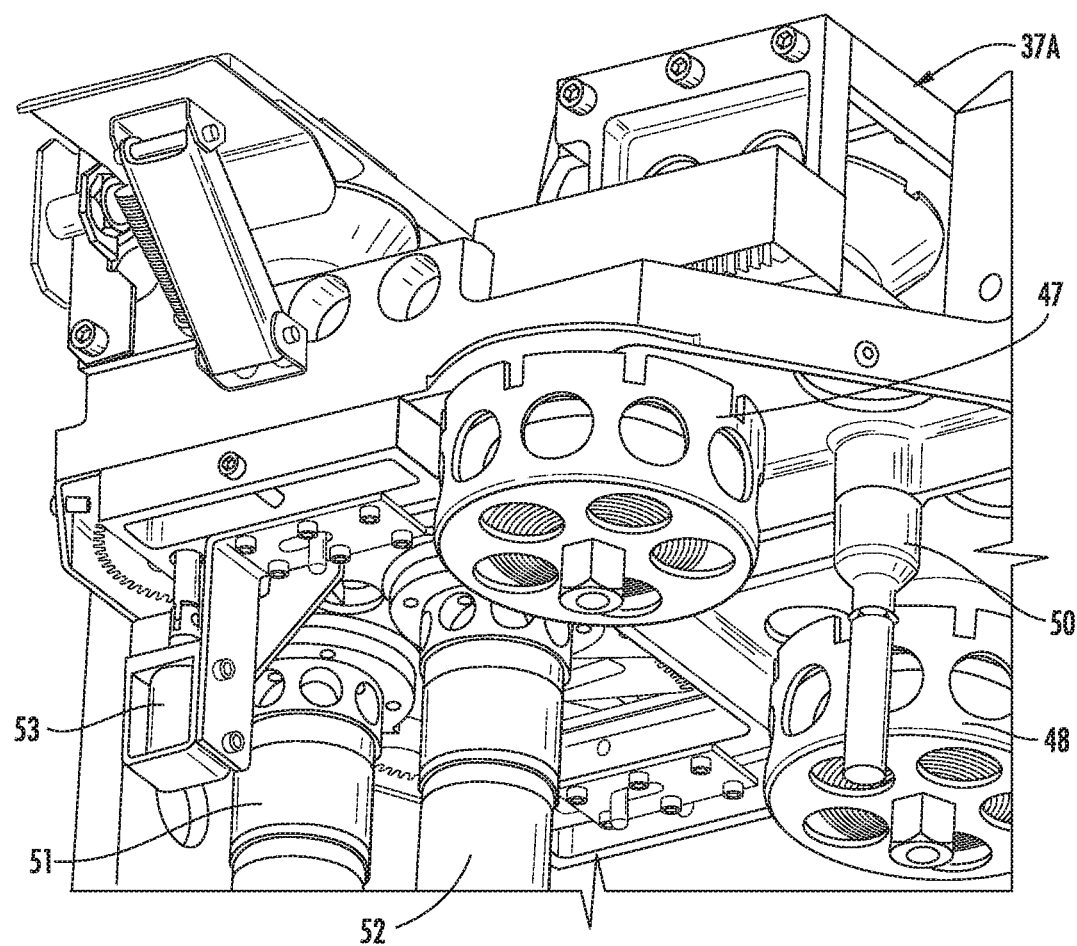
FIG. 10 shows the drive system of FIG. 7.
Figure 11:
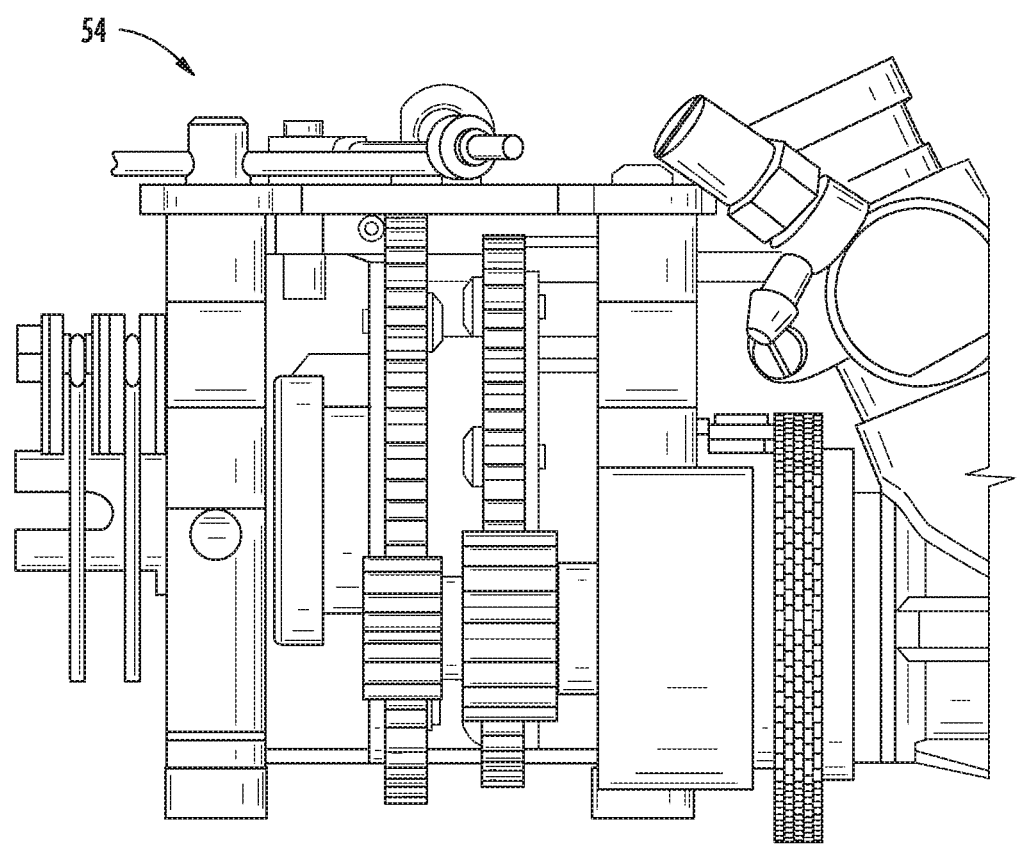
FIG. 11 shows a gear box of the inspection robot of FIG. 1.

Referring to FIG. 10, each of the drive systems 15A and 15B include motors and gearboxes for driving wheels 16B and 16C and 17B and 17C. For simplicity, only drive system 15A is being illustrated. As shown, drive system 15A includes a pair of motors 51 and 52 operably connected to wheels 16B and 16C. The motors 51 and 52 drive the wheels 16B and 16C to propel the robot 10 along the shield wire 11. A two speed gearbox 54 is also employed to aid the motors 51 and 52 in driving the wheels 16B and 16C. The gearbox 54 includes a first gear setting to promote low speed/high torque and a second gear setting to promote high speed/low torque. The first gear setting is used to traverse inclines, obstacles, or diverters (discussed below). The second gear setting is used to provide high speed inspection when desired. A wheel lock or parking brake 53 is provided to lock the wheels 16B and 16C in position on the shield wire 11 in the event that high winds, icing, or inclination preclude normal mobility of the robot 10. This allows the robot 10 to lock itself down to prevent damage.

Figure 12:
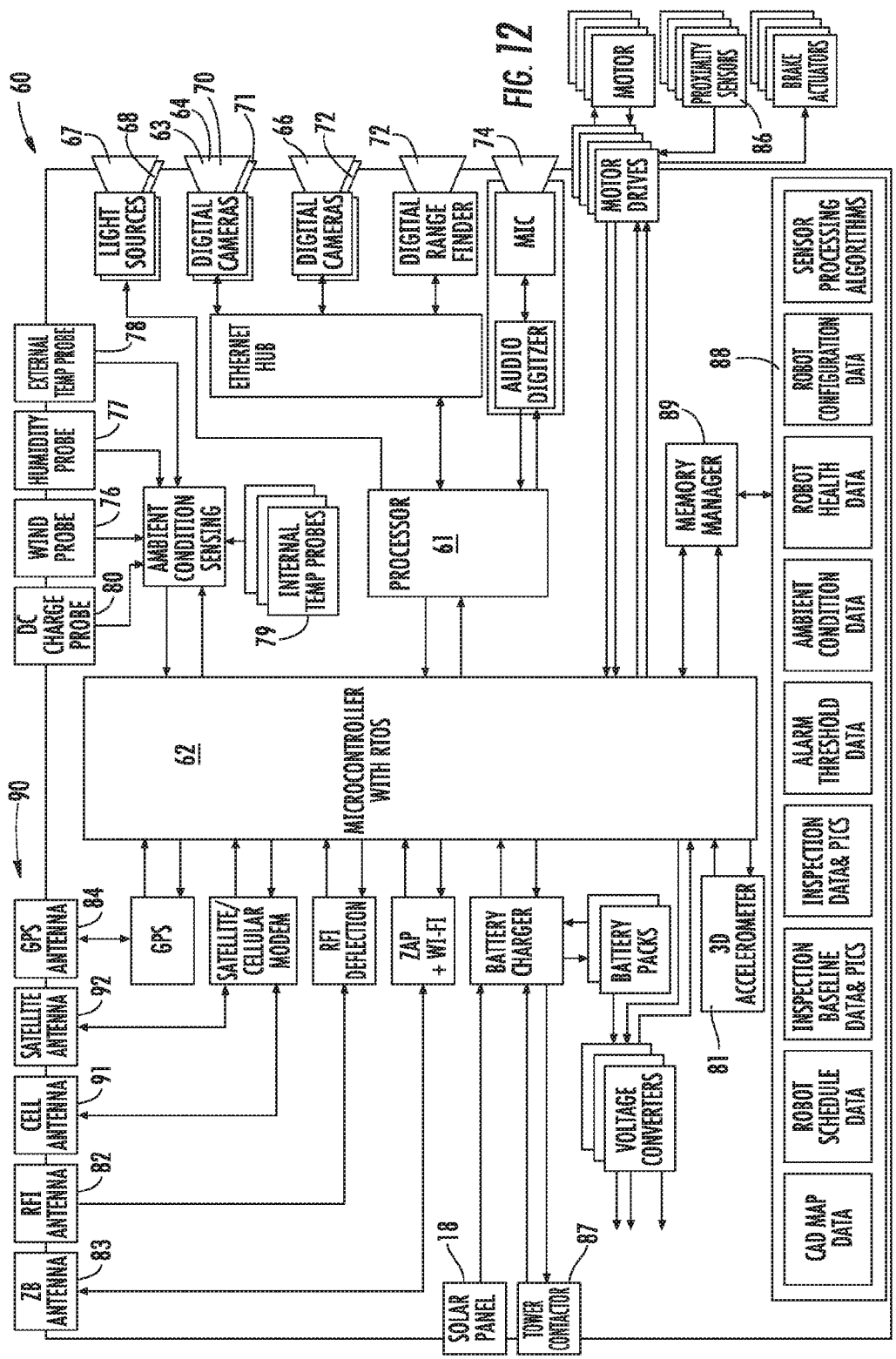
FIG. 12 is a functional schematic of a control system of the inspection robot of FIG. 1.
Figure 13:
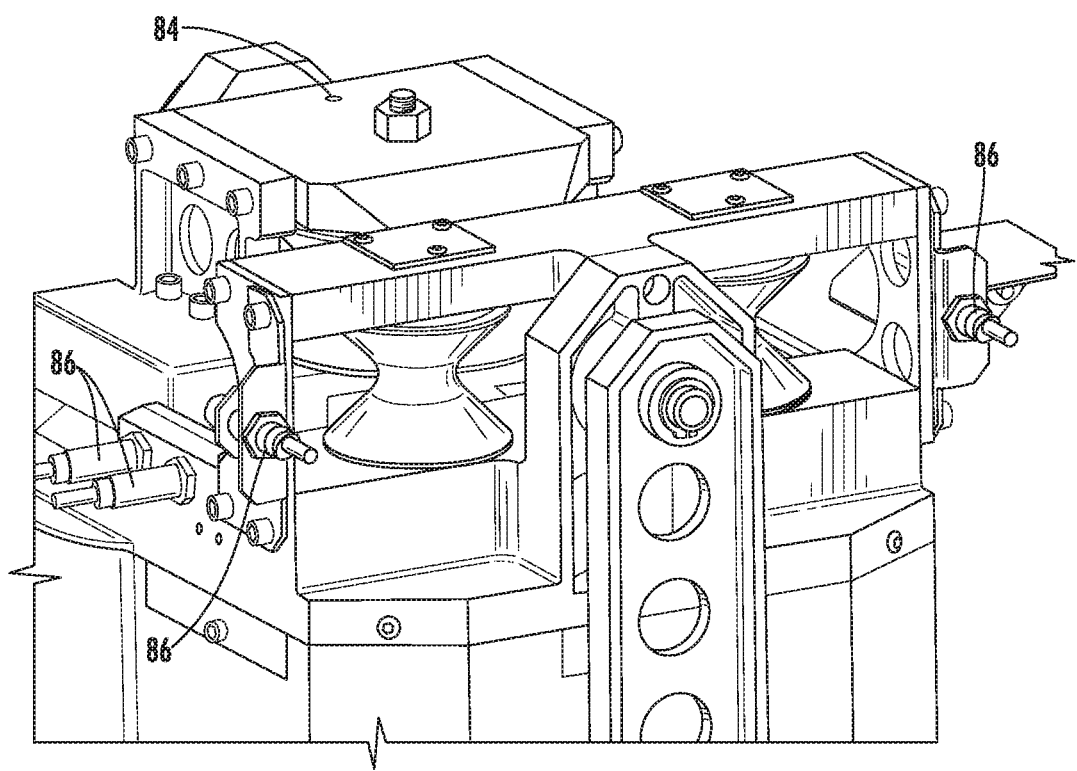
FIG. 13 shows sensors on the inspection robot of FIG. 1.
Figure 14:
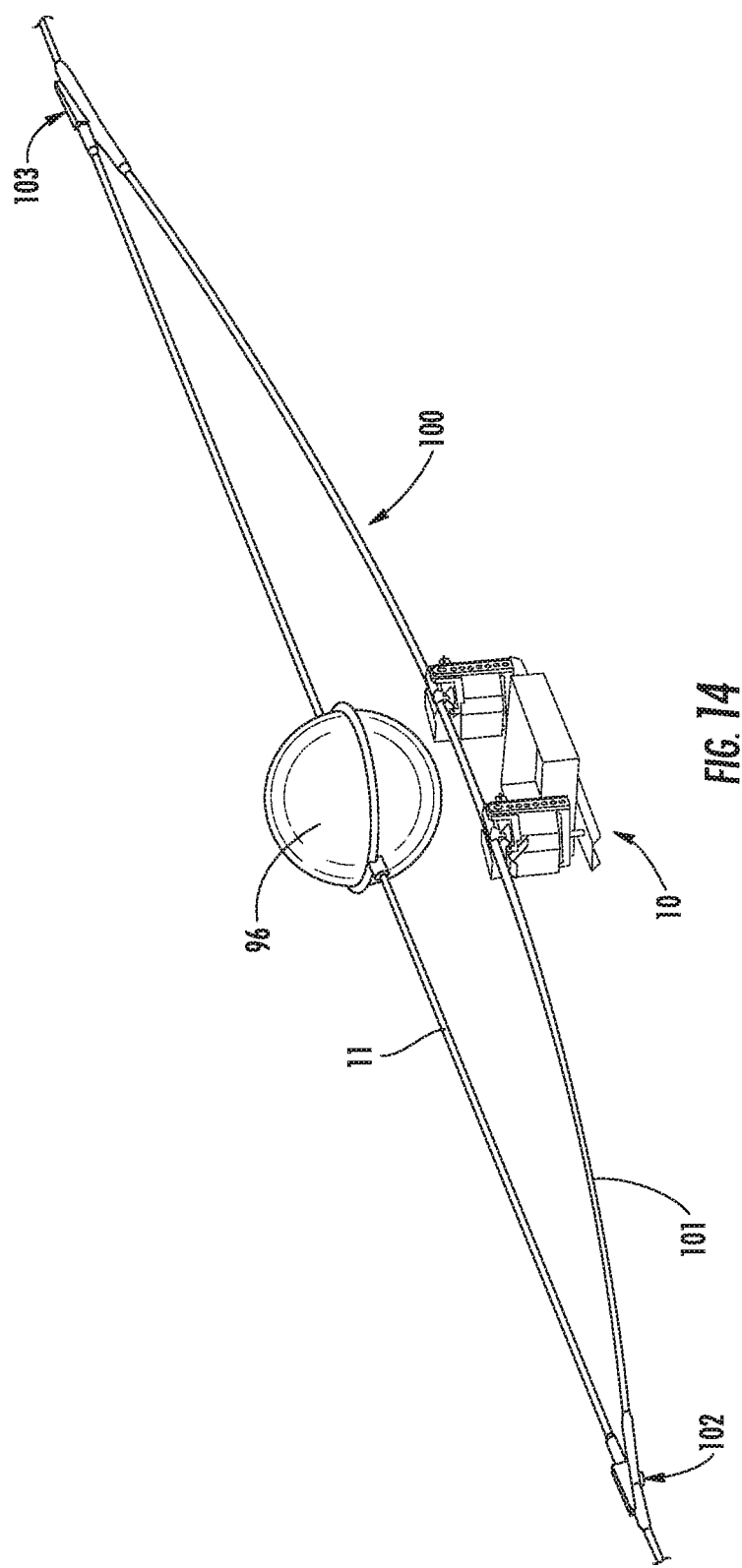
FIG. 14 shows a diverting system according to an embodiment of the invention for allowing the robot of FIG. 1 to traverse a structure.
Figure 15:
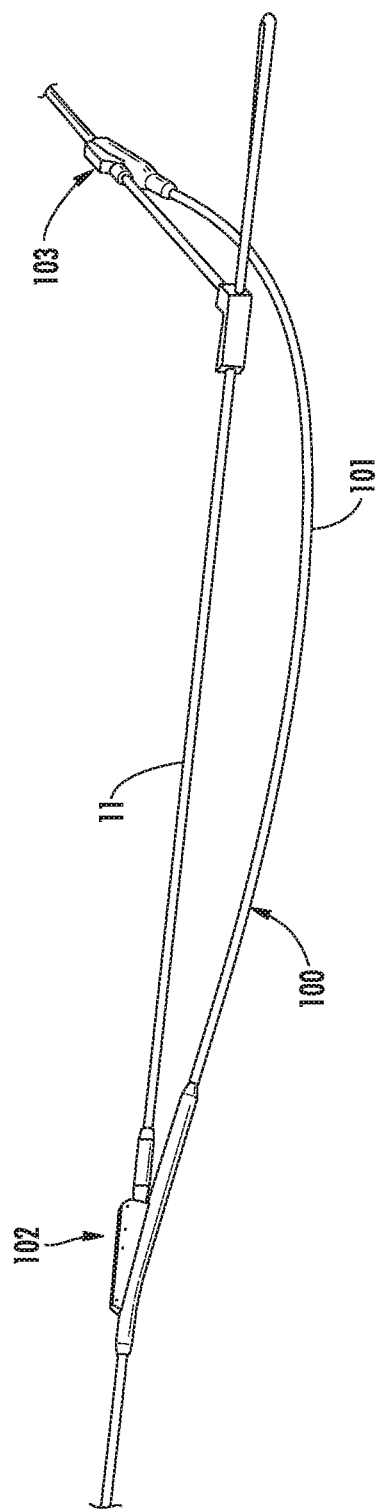
FIG. 15 shows the diverting system of FIG. 14 being used to traverse a junction point.
Figure 16:
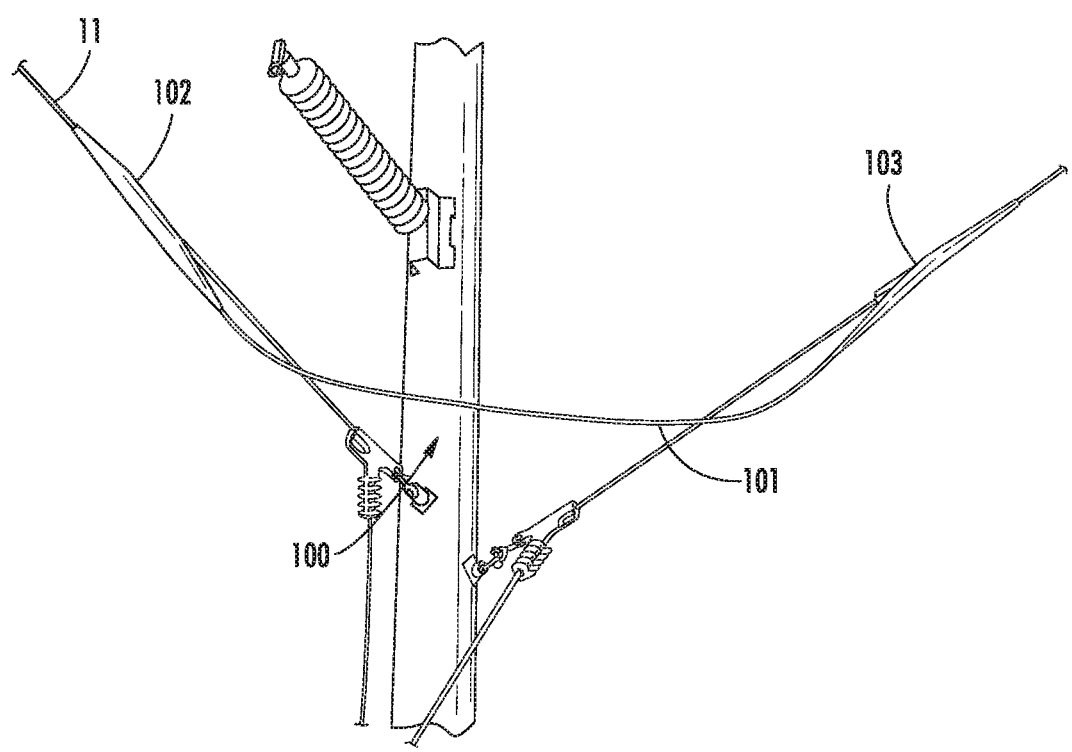
FIG. 16 shows the diverting system of FIG. 14 using a rigid bridge.

Referring to FIGS. 12 and 13, the robot 10 is controlled by a control system 60 having a central processor 61 and a microcontroller 62. The processor 61 and microcontroller 62 fuse data from multiple sensors (discussed below) to increase measurement confidence and draw conclusions that cannot be reached with single sensors. The processor 61 establishes alarm criteria for conditions that need to be communicated to users in a timely fashion. Alarms are based on real-time sensor values and logical states. The alarms are transmitted to a central web server over a wireless communication channel (discussed below).

The central processor 61 intelligently manages and employs its resources to collect meaningful transmission line system inspection data as well as internal health data. The processor 61 tests the status of all subsystems such as battery, solar panel, drive motor(s), sensors and communications. Subsystem failures, or impaired performance, are classified by level of criticality ranging from "reduction in performance" to "emergency stop". System health codes are saved in a system file for maintenance diagnostics. The processor 61 monitors the state of charge of the battery, solar cell charging current and load power of the computer and sensors. Based on this information, the processor manages the power to ensure that the robot 10 operates in a safe and reliable manner. Further, the processor 61 and microcontroller 62 allow for manual real-time control of the onboard sensors over a wireless communication channel to allow a user to command the robot to go to a particular location, take a picture, or perform other desirable functions.

The control system 60 further includes a plurality of sensors, cameras, and communication devices. Each of which will be discussed below. The control system 60 includes a plurality of high resolution cameras (forward looking 63, rear looking 64, and downward looking 66) for inspection of right of way, conductors, insulators, and towers. The cameras include automatic exposure control and automatic focus. Light sources 67 and 68 are also provided for the forward looking camera 63 and rear looking camera 64. A plurality of short-focus cameras (forward looking 70 and rear looking 71) are also included for navigation clearance. Light sources 67 and 68 may also be used for cameras 70 and 71. Downward camera 66 provides right of way inspection and phase conductor inspection. An infrared downward looking camera 72 may also be used.

One or more of the cameras 63, 64, 66, 70, and 71 may also be used to view the shield wire being traversed as well as diverters (discussed below). The view from the camera may be used by remote operators to assess mobility issues. The camera could be used to assess the shield wire, or, using image recognition, automatically identify insurmountable mobility challenges. If there is a mobility challenge identified, the image may be sent to an operator. Image processing for the images provided by the cameras 63, 64, 66, 70, and 71 may also be employed to identify selected areas or objects in the image, determine dimensions of objects or components, and recognize changes from stored reference data.

A laser rangefinder 73 is provided to scan the right of way and transmission line components below the robot 10. The rangefinder 73 records the height profile of objects in a line across the right of way and builds successive across-track lines to the record as the robot 10 advances. The control system 60 analyzes the rangefinder 73 data to identify features in the right of way profile that are changed from a reference database. The control system 60 also analyzes the rangefinder 73 data to identify the range to conductors and determine the height of conductors from the ground. This enables the system 60 to determine conductor sag.

An acoustic sensor 74 receives acoustic signals that may be digitally recorded on a continual basis or periodic basis. Time-stamped recordings may be relayed to a central server for correlation with abnormal events. On-board acoustic signal processing may be used to identify problem conditions (avian activity, corona, arcing, drive train wear or damage detection, etc.) By using multiple microphones, the acoustic sensor 74 can also be used to derive the direction from which the acoustic signals reside.

A plurality of other sensors and devices are also included in the control system 60 to provide accurate and up-to-date information to utilities. For example, there are weather sensors 76-78 for measuring external air temperature, relative humidity, and wind speed; an internal robot temperature sensor 79 for measuring the temperature inside the robot 10; a DC charge sensor 80 to determine when lightening events are likely to occur; a 3-D accelerometer 81 to measure the tilt or vertical inclination of the robot 10 and the shield wire 11 and to identify any major vibration modes of the shield wire 11; a radio frequency interference sensor 82 to provide the robot 10 with a broadband radio frequency detector capable of detecting radio frequency interference; a wireless sensor reader 83 to read data from distributed sensors placed along the conductors, insulators, towers or other transmission line component; a global positioning sensor (GPS) 84 for identifying the robot's 10 position and speed; proximity sensors 86; a tower contactor 87 to allow charging of the batteries at a local docking station; a non-volatile memory 88 managed by a memory manager 89 to store data such as map data, inspection data, alarm data, health data, etc.; and a communications system 90 having a local wireless modem 91 and a satellite wireless modem 92.

The communications system 90 transmits key information to a systems operator and provides control options via either the local wireless modem 91 or the satellite wireless modem 92. The robot 10 is designed to travel autonomously on a preprogrammed path and transmit data back wirelessly about the condition of the line and the robot 10 to the systems operator. The robot 10 collects data and processes the data on board, and then transmits only key results back to the operator. Operators may download more detailed data upon request to the robot 10. The robot 10 also allows a remote operator to give it commands to move to a specific site or location, take specific actions such as move back and forth, and take specific images, etc. The local wireless modem 91 also allows for local wireless communications to allow a user within a short distance of the robot 10 to control the main functions, request robot status, initialize deployment, and download sensor data from a wireless device such as a cell phone. The location and speed of the robot is determined using the onboard GPS system 84.

Under normal circumstances, the robot 10 traverses the shield wire 11 at a speed that conserves power while performing a very detailed assessment. The objective is to provide an inspection which exceeds or at minimum is equivalent to a comprehensive hovering helicopter inspection. In the event that a problem is detected in an overhead transmission line, an operator may speed up the robot 10 and send the robot 10 to the detected problem for inspection. Further, if a wind speed sensor on the robot 10 determines that the wind speed is too great or if an internal temperature sensor determines that the internal temperature of the robot 10 is too high, the robot 10 may shut itself down to prevent damage. As shown, the microcontroller 62 uses the data collected from the sensors and devices of the control system 60 to control the motors and brake actuators of the robot 10.

Referring to FIGS. 14-17, a diverting system according to an embodiment of the invention is shown generally at reference numeral 100. As shown, the robot 10 travels along the shield wire 11 to enable simpler traversing of structures 96, easier maintenance, and reduced impact of electric and magnetic fields. The diverting system 100 may be installed on the shield wire 11 to permit the robot to traverse structures 96 positioned on the shield wire 11 or structures supporting the shield wire 11, such as towers. The diverting system 100 includes a bridge 101 interconnected with the shield wire 11 by a pair of diverters 102 and 103 positioned at opposing ends of the bridge 101 to allow the robot 10 to disengage from the shield wire 11, engage the bridge 101, and re-engage the shield wire 11. As shown in FIGS. 14-17, the diverting system 100 may be used traverse inline objects, FIG. 14, traverse a junction points such as T-sections in the line, FIG. 15, traverse a corner post or other structure, FIGS. 16-17, and to traverse other types of objects. In addition, the diverting system 100 may include a flexible bridge (i.e., cable, etc.) like that shown in FIGS. 14, 15, and 17 or a rigid bridge (rod, tube, etc.) like that shown in FIG. 16 which can be molded to provide the desired path. As illustrated, when using the diverter system 100 in the configuration shown in FIG. 17, a diverter 105 is also used to provide support to the bridge 101. The different styles of diverters will be discussed below.

Figure 18:
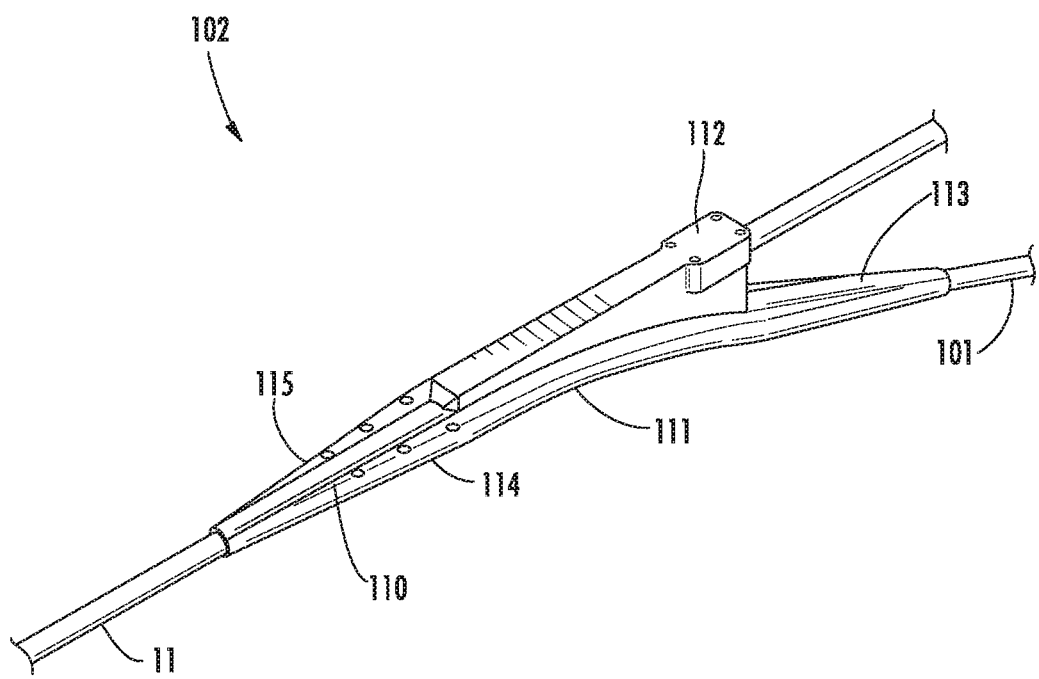
FIG. 18 shows a diverter of the diverting system of FIG. 14.
Figure 19:
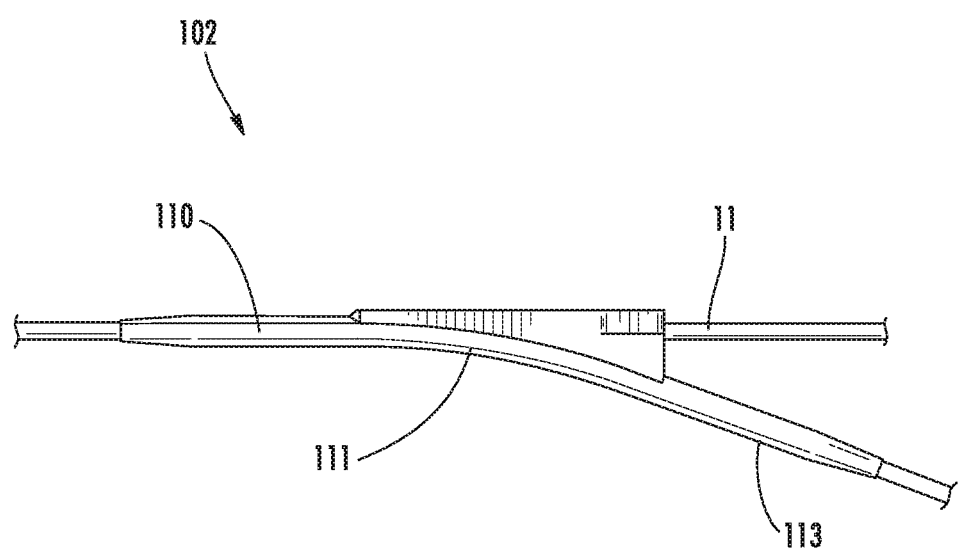
FIG. 19 is a side view of the diverter of FIG. 18.

Diverters 102 and 103 are identical, thus, for discussion purposes, only diverter 102 will be discussed in detail. As illustrated in FIGS. 18 and 19, the diverter 102 is attached to the shield wire 11 and includes a first transfer section 110 for transferring the robot from the shield wire 11 onto the diverter 102, a crossover section 111 having a pre-determined transition radius, FIG. 19, for diverting the wheels of the robot 10 onto the diverting system 100 and allow the bridge 101 to ride below the shield wire at a distance suitable for allowing the robot 10 to traverse an object, a diverter restraint 112 for maintaining the diverter 102 in position, and a second transfer section 113 for transferring the robot 10 onto the bridge 101. Diverter 103 is identical to diverter 102 and is used to transfer the robot 10 from the bridge 101 to the shield wire 11. The diverter 102 may be of one piece construction or comprised of multiple pieces bolted together to allow easier installation on the shield wire 11.

As shown, the first and second transfer sections 110 and 113 are shaped to force the wheels 16A-16C or drive system 15A and wheels 17A-17C of drive system 15B to move from a closed position around the shield wire 11 to an open position sized to mate with the width of the crossover section 111 (first transfer section 110) and back to a closed position around the bridge 101 from an open position sized to mate with the width of the crossover section 111 (second transfer section 113). Diverter 103 works in the opposite direction.

Sides 114 and 115 of the diverter 102 are shaped to mate with the grooves of the wheels 16A-16C and 17A-17C such that the wheels 16A-16C and 17A-17C retain a tight, anti-slip connection with the diverter 102.

Figure 17:
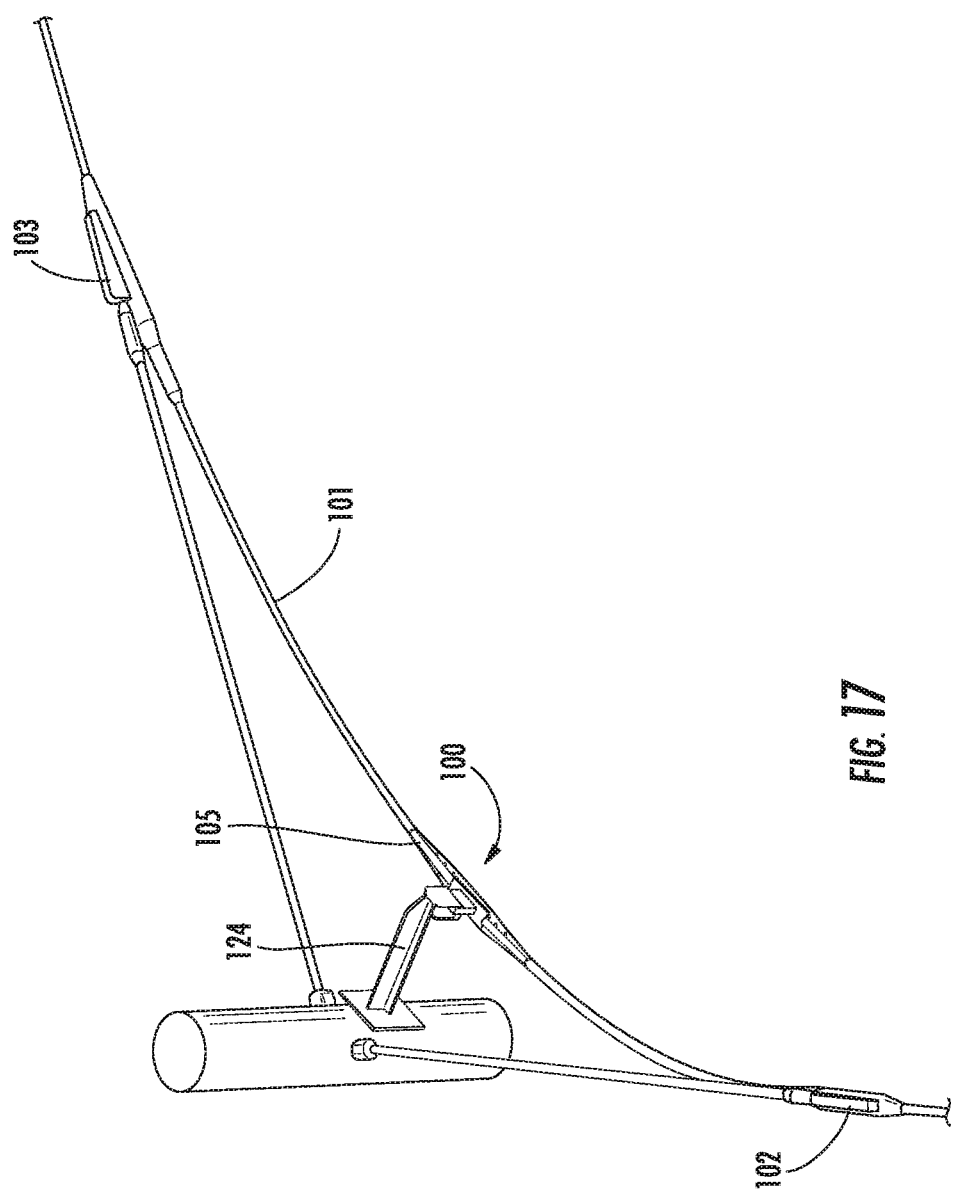
FIG. 17 shows the diverting system of FIG. 14 with a central diverter to support the bridge.
Figure 20:
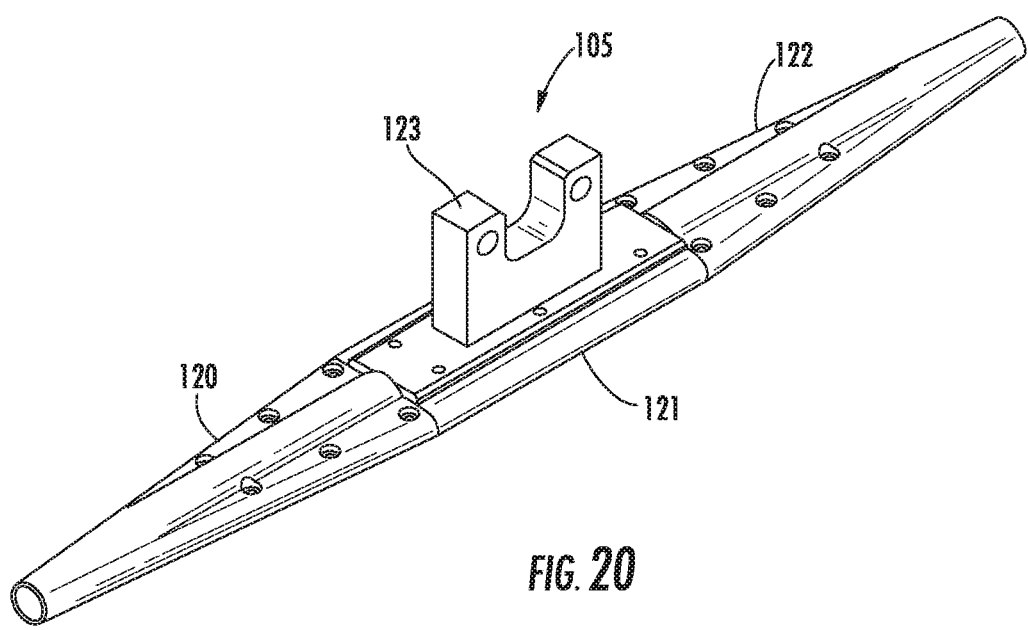
FIG. 20 is a perspective view of the central diverter of FIG. 17.
Figure 21:
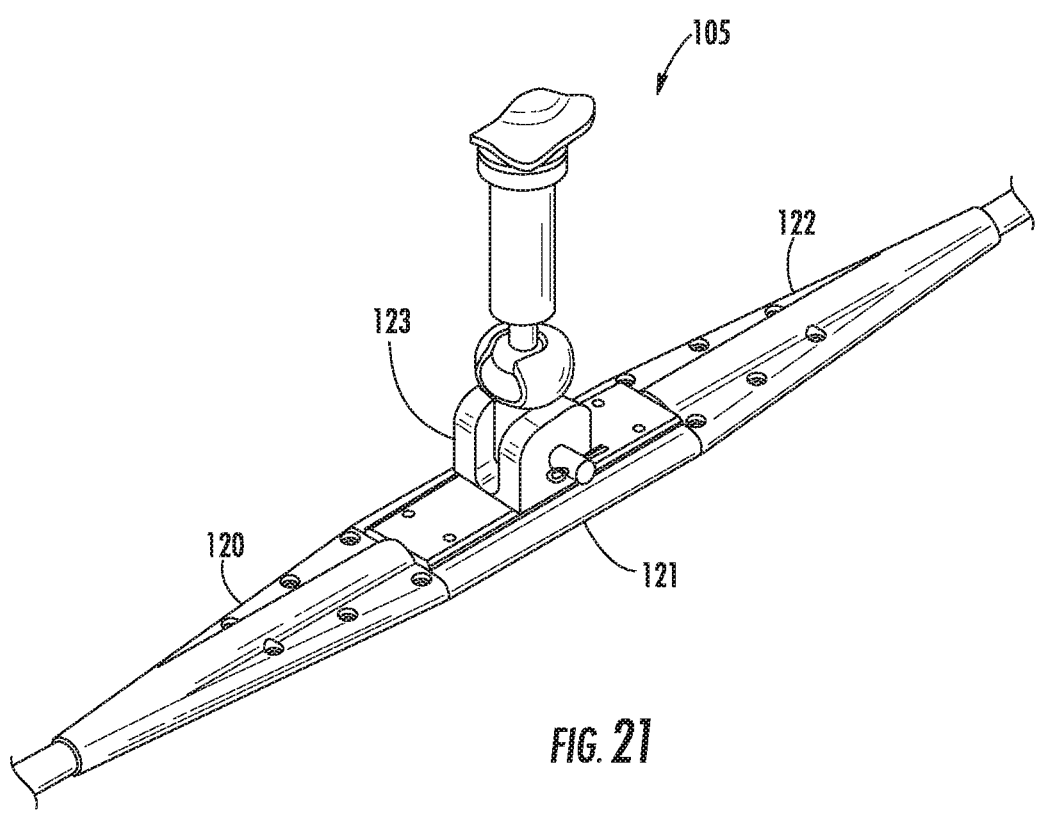
FIG. 21 shows the diverter of FIG. 20 with a different mounting system.

Like diverter 102, diverter 105, FIG. 20, includes first and second transfer sections 120 and 122 and a crossover section 121. The diverter 105 operates in the same manner as diverter 102 except that the crossover section 121 does not have a predetermined radius to allow the bridge 101 to ride below the shield wire. In this instance, diverter 105 is designed to provide a support to and reside inline with the bridge 101, as shown in FIG. 17. The diverter 105 also includes a mount 123 for mounting to a support structure 124, FIG. 17. The mount 123 may be a single bracket for mounting to a support like support 124, maybe a double bracket like that shown in FIG. 21 for mounting to support 125, or any other suitable configuration. This configuration allows the supports to support the bridge 101 in any desired path.

Figure 22:
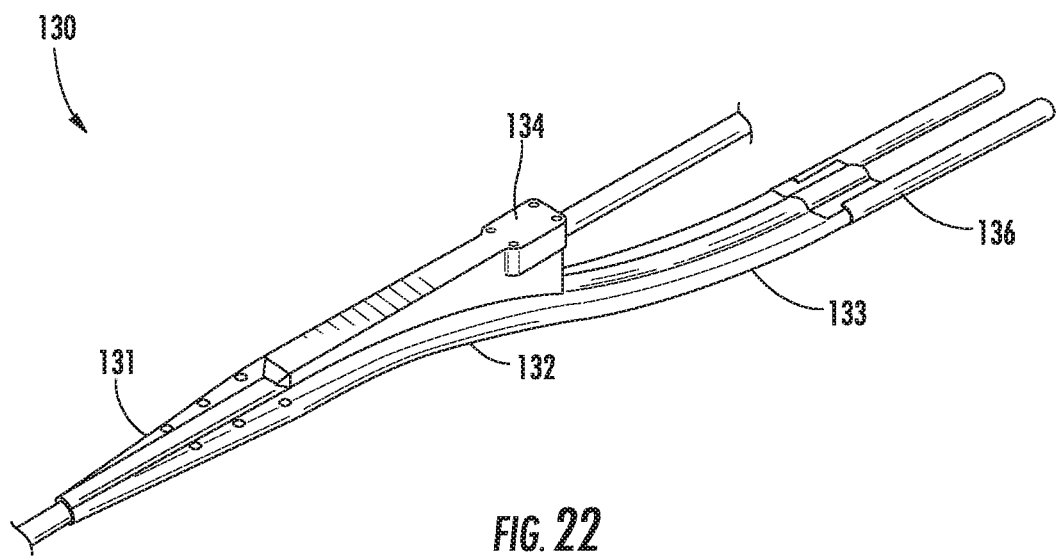
FIG. 22 shows a diverter for use in a diverting system.

Referring to FIG. 22, another diverter according to an embodiment is shown at reference numeral 130. Like the diverter 102, diverter 130 includes first and second transfer sections 131 and 133, a crossover section 132 having a predetermined transition radius, and a diverter restraint 134. Unlike diverter 102, the second transfer section 133 of diverter 130 is of a parallel branch design that allows the diverter 130 to be connected to a rigid, parallel branch bridge 136.

Figure 23:
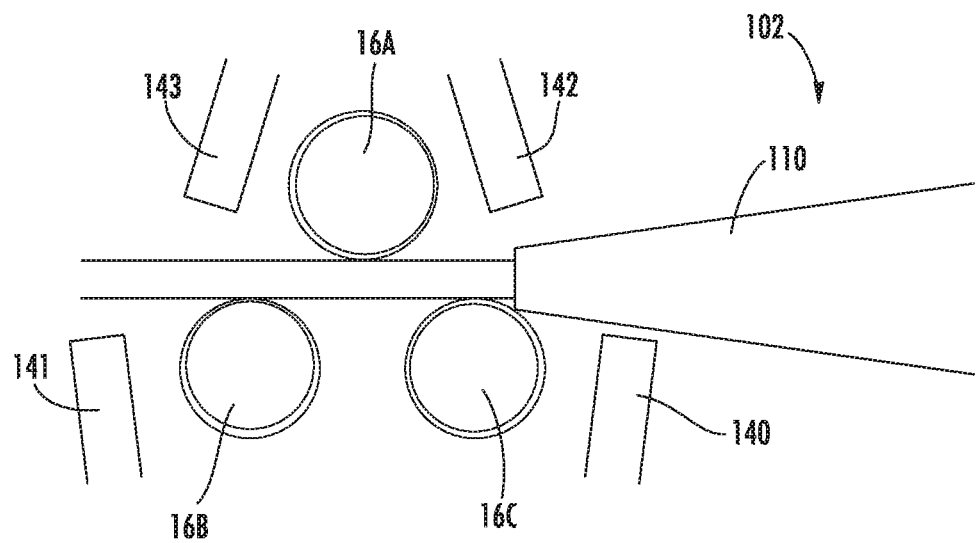
FIG. 23 shows the drive system of FIG. 7 engaging a diverter.
Figure 24:
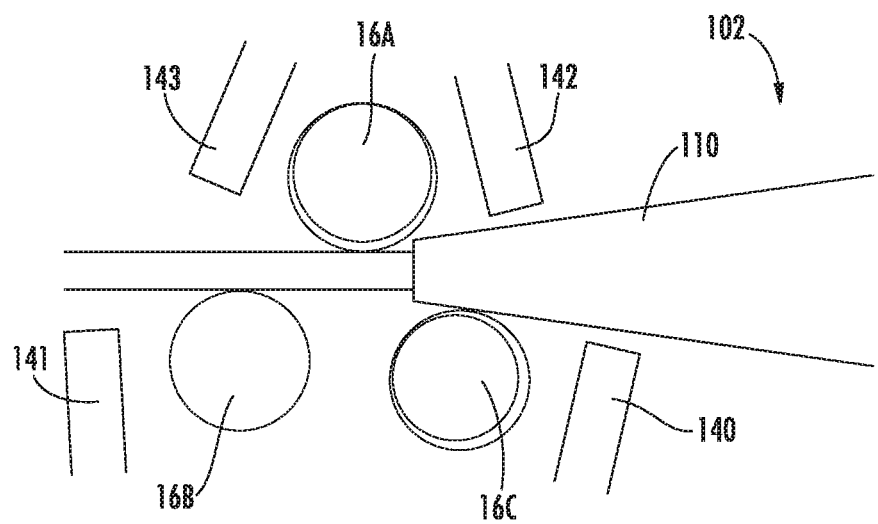
FIG. 24 shows the drive system of FIG. 23 engaging the diverter.

For simplicity, the process described below is taken in reference to diverter 102 and drive system 15A. It should be appreciated that the process described for drive system 15A also applies to drive system 15B. Referring to FIGS. 23 and 24, when the robot 10 approaches the diverter system 100, drive system 15A disengages the shield wire 11 and engages the first transfer section 110 of the diverter 102 travels over the crossover section 111 and onto the bridge 101. Sensors 140-143 tell the robot 10 when the wheels 16A-16C are engaging and disengaging the diverter 102. Once the robot 10 has traversed the structure 96, the drive system 15A disengages diverter 103 and reengages the shield wire 11. This approach reduces the complexity of the robot 10 and allows the robot 10 to easily traverse the structure 96. It also reduces power requirements and does not require complex control systems, thereby increasing reliability.

Figure 25:
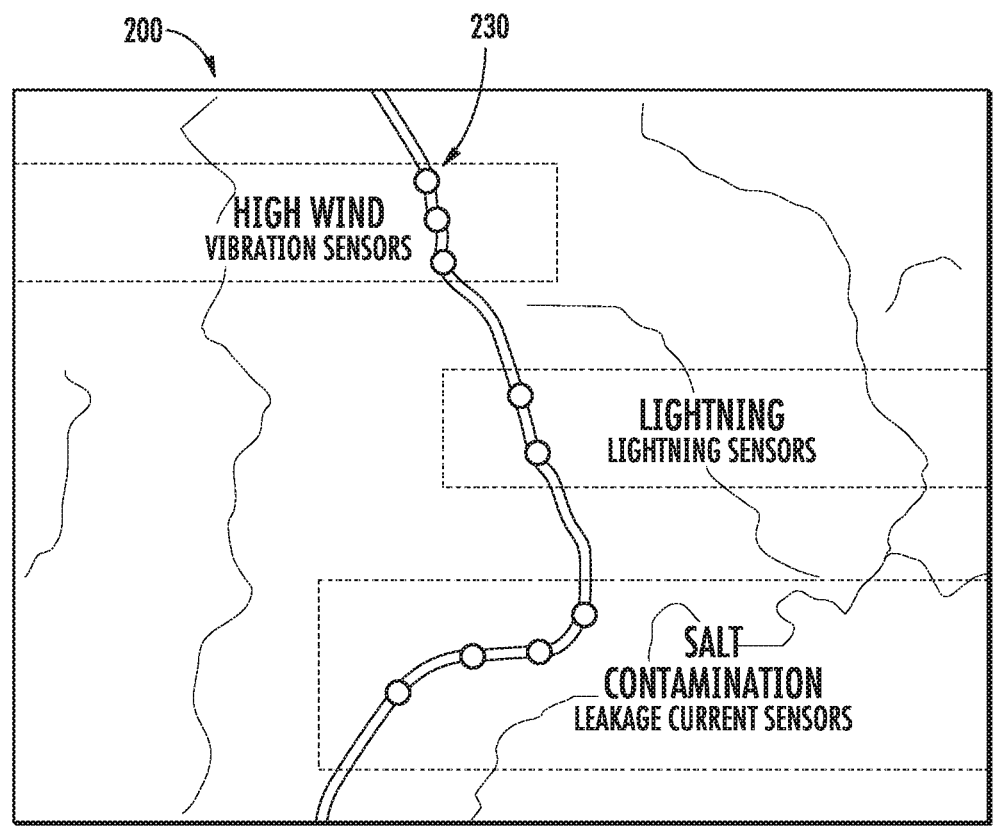
FIG. 25 shows a sensor system according to an embodiment of the invention.

As shown in FIG. 25, a sensor system according to an embodiment of the invention is shown generally at reference numeral 200. The system 200 includes a plurality of strategically placed sensors (for example, RF sensors) 230 positioned along transmission lines.

The system 200 may be implemented to monitor and inspect overhead transmission lines and to continually assess concerns with components such as insulators, conductors, and compression connectors. For example, the sensors 230 would be deployed in areas of significant environmental stress or where specific component types have been installed. Deployed sensors 230 continually collect data, thereby developing histograms and determining maximum values. The historical results and the present measurements may be transmitted to the robot 10 when it is in close proximity to the sensors 230 for analysis, or the sensors 230 may be used in conjunction with ground crews, helicopters, and other inspection methods capable of receiving the data from the sensors 230. It should be appreciated that a local base station may also be installed to continuously monitor and collect data from the sensors 230.

The system 200 allows remotely located staff to obtain detailed, up-to-date knowledge of transmission line component and right of way conditions, thereby increasing reliability while reducing operations and maintenance costs.

The foregoing has described a line inspection robot and system. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

We claim:

1. A diverter system to allow a line inspection robot to traverse an object, comprising:
    (a) a first diverter attached to a shield wire;
    (b) a second diverter attached to the shield wire at a position spaced from the first diverter;
    (c) a bridge having a first end connected to the first diverter and a second end connected to the second diverter;
    (d) wherein the first and second diverters each include a pre-determined transition radius to allow the bridge to ride below the shield wire, and wherein the first diverter disengages the robot from the shield wire and onto the bridge and the second diverter disengages the robot from the bridge and onto the shield wire to allow the robot to traverse the object.

2. The diverter system according to claim 1, wherein the first diverter includes:
    (a) a first transfer section adapted to transfer the robot from the shield wire onto the first diverter;
    (b) a crossover section adapted to divert wheels of the robot onto the diverting system; and
    (c) a second transfer section adapted to transfer the robot from the first diverter onto the bridge.

3. The diverter system according to claim 1, wherein the second diverter includes:
    (a) a first transfer section adapted to transfer the robot from the second diverter to the shield wire;
    (b) a crossover section adapted to divert wheels of the robot onto the shield wire; and
    (c) a second transfer section adapted to transfer the robot from the bridge onto the second diverter.

4. The diverter system according to claim 1, wherein the bridge is flexible.

5. The diverter system according to claim 1, wherein the bridge is rigid.

6. The diverter system according to claim 2, wherein the first transfer section is adapted to move the wheels of the robot from a closed position around the shield wire to an open position sized to mate with the crossover section.

7. The diverter system according to claim 2, wherein the second transfer section is adapted to allow the wheels of the robot to move from an open position sized to mate with the crossover section to a closed position sized to secure the robot to the bridge.

8. The diverter system according to claim 3, wherein the second transfer section is adapted to move the wheels of the robot from a closed position around the bridge to an open position sized to mate with the crossover section.

9. The diverter system according to claim 3, wherein the first transfer section is adapted to allow the wheels of the robot to move from an open position sized to mate with the crossover section to a closed position sized to secure the robot to the shield wire.

10. The diverter system according to claim 1, further including a third diverter adapted to support the bridge at a position between the first and second diverters.

11. The diverter system according to claim 1, the first and second diverters each include opposing sides shaped to mate with grooves of wheels of the robot such that the wheels retain a tight, anti-slip connection with the first and second diverters.

* * * * *